United States Patent [19]

Sidler

[11] Patent Number: 5,252,114
[45] Date of Patent: Oct. 12, 1993

[54] GLASSWARE FORMING MACHINE HAVING A PIVOTALLY SUPPORTED MOLD MECHANISM WHICH FACILITATES REPLACEMENT THEREOF

[75] Inventor: Werner Sidler, Esslingen, Switzerland

[73] Assignee: Emhart Glass Machinery Investments Inc., Wilmington, Del.

[21] Appl. No.: 5,995

[22] Filed: Jan. 19, 1993

[30] Foreign Application Priority Data

Feb. 8, 1992 [GB] United Kingdom ............... 9202706

[51] Int. Cl.[5] .................................. C03B 9/353
[52] U.S. Cl. ........................... 65/229; 65/359; 65/361; 65/261
[58] Field of Search ............... 65/172, 361, 261, 359, 65/229

[56] References Cited

U.S. PATENT DOCUMENTS

| | | | |
|---|---|---|---|
| 4,009,016 | 2/1977 | Foster | 65/361 |
| 4,295,873 | 10/1981 | Trutner | 65/359 |
| 4,448,600 | 5/1989 | Braithwaite | 65/261 |

Primary Examiner—W. Gary Jones
Assistant Examiner—John M. S. Hoffmann
Attorney, Agent, or Firm—Spencer T. Smith

[57] ABSTRACT

A parallel movement mould mechanism for use in a glassware forming machine comprises mould supports mounted for movement on horizontal shafts and means for moving the mould supports comprising a cage assembly in which a piston and cylinder device linked to the mould supports is mounted, the cage assembly being mounted for adjustable pivotal (22) movement with respect to shafts so that adjustment of the position of the cage assembly adjusts the position of the center line of moulds (18) supported on the mould supports.

6 Claims, 5 Drawing Sheets

GLASSWARE FORMING MACHINE HAVING A PIVOTALLY SUPPORTED MOLD MECHANISM WHICH FACILITATES REPLACEMENT THEREOF

This invention is concerned with mould mechanisms for use in glassware forming machines.

BACKGROUND TO THE INVENTION

A common type of glassware forming machine is the so-called 'individual section' or I.S. machine which comprises a bank of separate sections which are caused to operate in staggered time relationship one with another so that each section in turn produces glassware. I.S. machines comprising 10, 12 or even more sections are now common place.

Problems arise in the operation of such machines if one of the mechanisms breaks down, as a major repair of the mechanism will entail removal of the section in question from the machine and replacement by another section, which is a lengthy and time consuming operation. Major repair work can be more simply and quickly carried out if the mechanism in question can be readily removed from the section as a unit, and replaced by a substitute unit while the defective unit is being repaired. In such circumstances it is desirable that the replacement unit shall be readily adjustable to ensure that its operating parts are precisely aligned with the remaining mechanisms in the section.

A section of an I.S. machine normally contains two sets of moulds, a set comprising one, two, three or four pairs of mould halves, one set being adapted for forming a group of parisons from gobs of molten glass delivered to the machine, the other set being adapted for forming a group of blown containers from the parisons. It will be realized that it is essential that a replacement mould mechanism should have the facility to ensure that its set cf moulds is correctly aligned with the remaining mechanisms of the machine.

It is one of the objects of the present invention to provide a mould opening and closing a mechanism which can be readily adjusted.

BRIEF STATEMENT OF THE INVENTION

The present invention provides as one of its features a mould mechanism for a glassware forming machine comprising a frame member, horizontal shafts supported in the frame member, first and second mould supports mounted for sliding movement on the horizontal shafts to bring moulds supported on the mould supports linearly between a closed position and an open position, means for moving the mould supports between such closed and open position comprising a cage assembly pivotally supported in the frame member about an axis parallel to the center line of the moulds, a piston and cylinder device mounted in the cage assembly, first and second links connecting the first and second mould supports respectively to the piston and cylinder device so that on operation of the piston and cylinder device the mould supports are moved between their open and their closed positions, and means for adjusting the angular position of the cage assembly about said axis, whereby to adjust the position of the center line of the moulds with respect to the frame member.

In the accompanying drawings

DETAILED DESCRIPTION OF THE INVENTION

Figure 2:
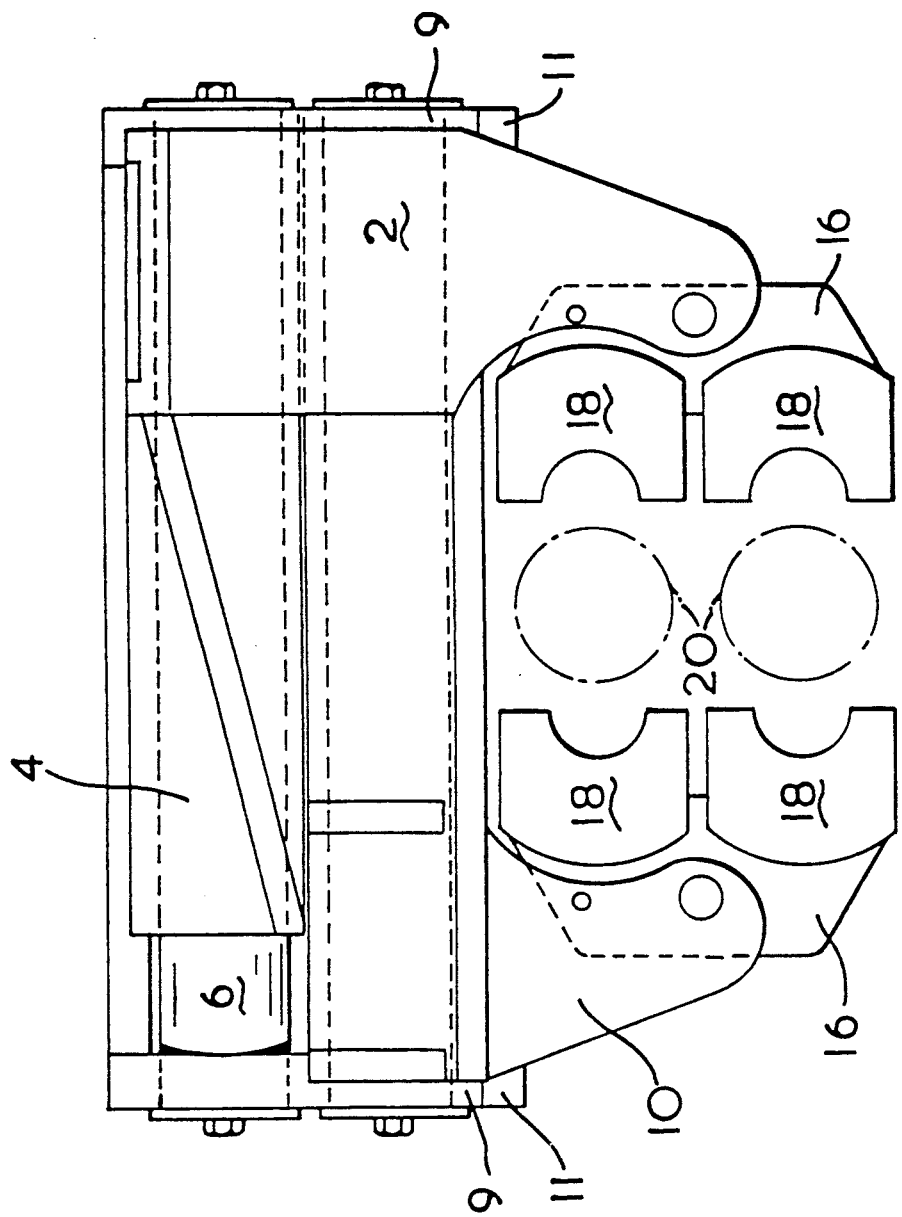
FIG. 2 shows, partly diagrammatically, a plan view of the mould mechanism.

The illustrative mould mechanism is a self contained unit suitable for incorporation in a glassware forming machine of modular construction and comprises a frame member 8 having two forwardly extending supporting plates 9 (FIG. 2) and a cross bar 11 joining the plates 9 to form a closed frame. A first mould support 2 comprises a sleeve member 4 by which it is mounted for sliding movement on a horizontal shaft 6 supported between the plates 9 of the frame member 8. A second mould support 10 comprises a sleeve member 12 by which it is mounted for sliding movement on a horizontal shaft 14 extending alongside the shaft 6 and supported between the plates 9. Each of the mould supports 2 and 10 support a mould holder 16 on which mould halves 18 may be supported: the mould supports 2 and 10 are thus mounted for linear movement towards and away from each other to bring the mould halves 18 between a closed position (not shown) and an open position, indicated schematically in FIG. 2. When in their closed position, the mould halves 18 form, with a bottom plate 20, a cavity in which molten glass may be formed into a container.

Figure 1:
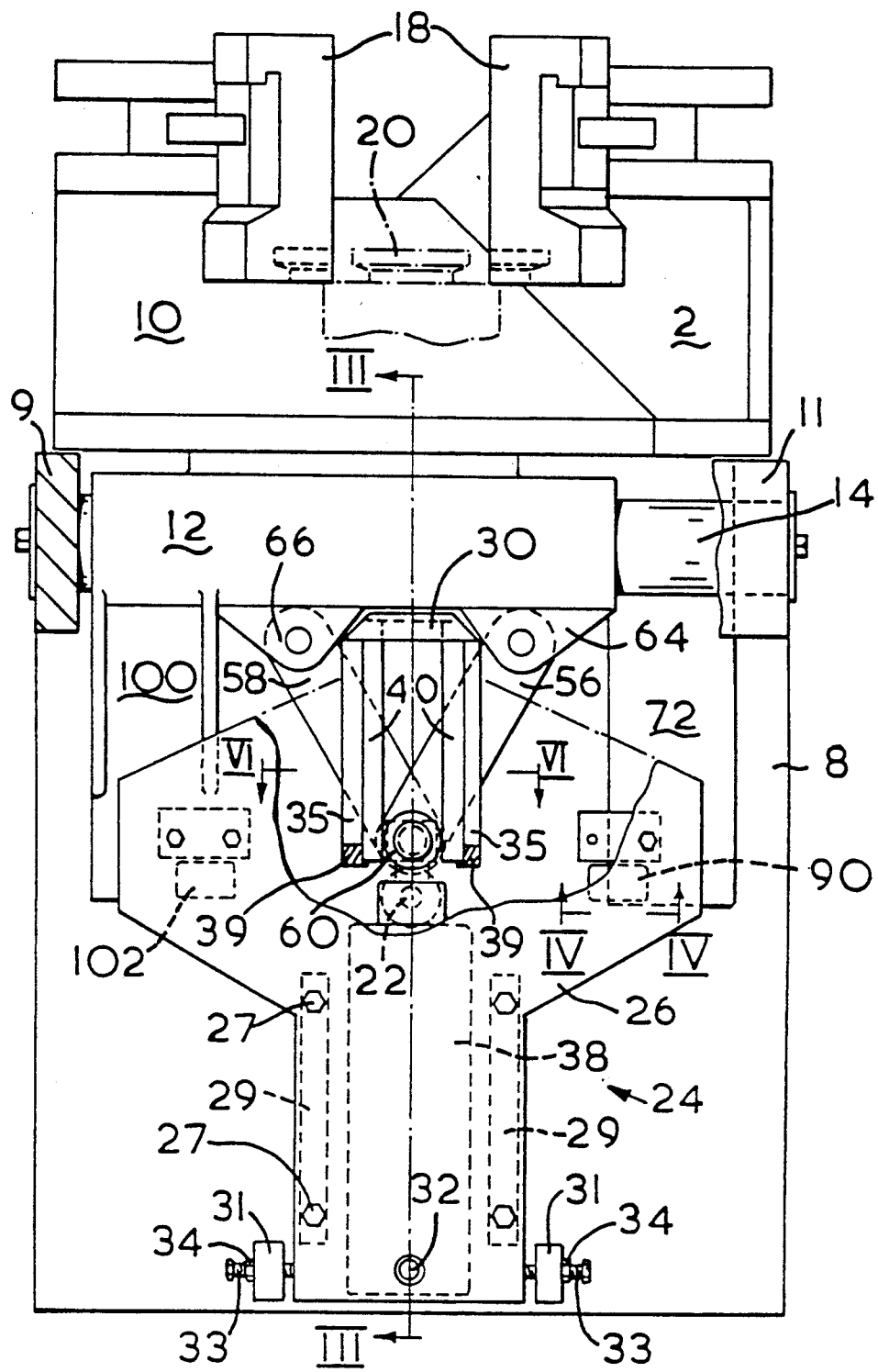
FIG. 1 shows an end view of the illustrative mould mechanism with certain parts broken away
Figure 3:
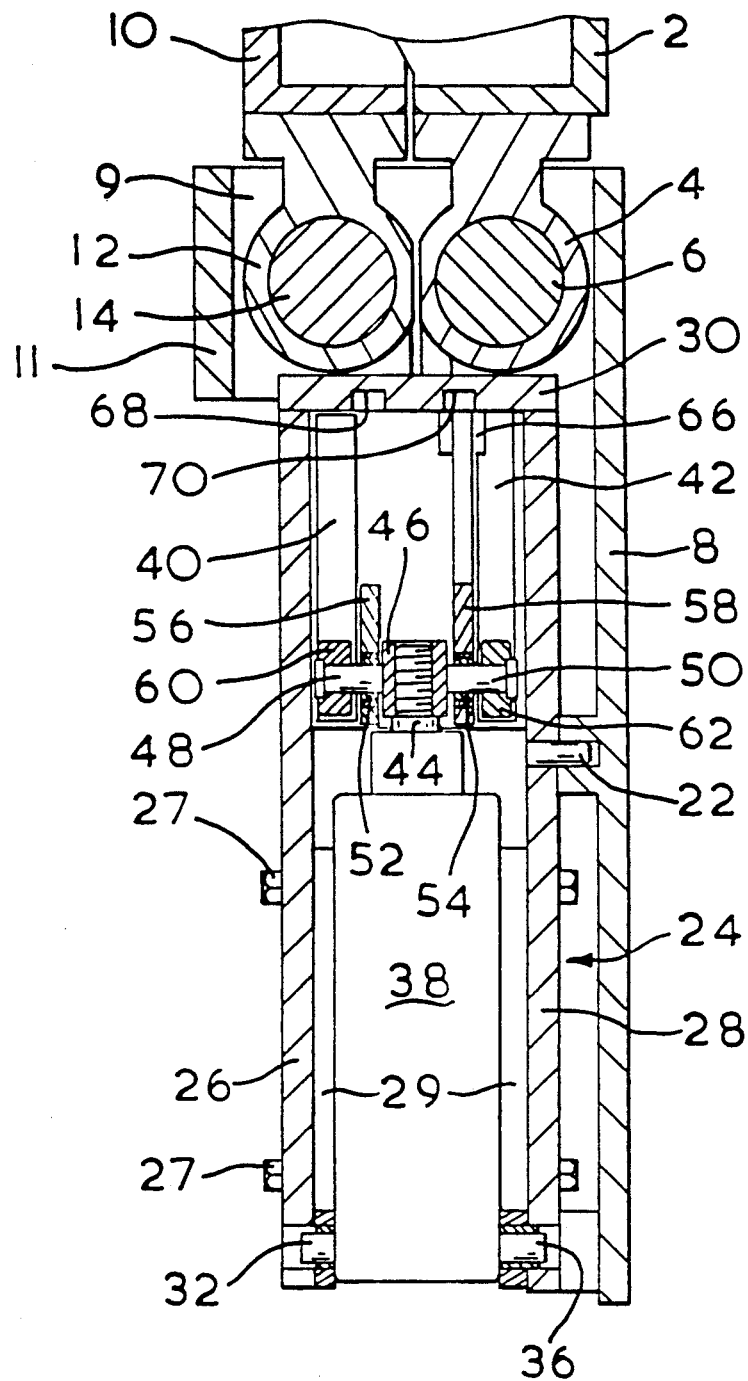
FIG. 3 shows a view in section taken along the line III—III of FIG. 1.

The means by which the mould supports are moved between their open and their)closed positions will now be described (see FIGS. 1 and 3). Pivoted to the frame member 8 about a pivot 22 extending parallel to the center line of the mould halves is a cage assembly 24 comprising a front plate 26, a rear plate 28 two side plates 29 and a cross plate 30.

The front plate 26 and the rear plate 28 are generally T shaped, and the side plates 29 are secured between stem portions of the plates 26 and 28 by bolts 27. The cross plate 30 is secured across uppermost portions of the plates 26 and 28. Lugs 31,31 extend forwardly from the frame member 8 adjacent the lower end of the stem portion of the rear plate 28. Adjustable positioning screws 33,33 with locking nuts 34, 34, are threaded in the lugs 31 and engage opposite side faces of the plate 28. Thus by adjustment of the screws 33,33, movement of the cage assembly 24 about the pivot 22 can be obtained. This, as will be described later, through movement of the sleeve members 4 and 12 on their shafts 6 and 14 will provide for a transverse adjustment of the center line of the mould halves with respect to the frame member 8 which enables the accurate alignment of the mould halves 18 and the articles formed therein with other mechanisms in the forming machine. An adjustment of about 0.3 cm either side of a notional center line may be achieved.

Pivoted on shafts 32, 36 (FIG. 3) mounted in the lower end portions of the plates 26,28 is a piston and cylinder device 38.

Figure 6:
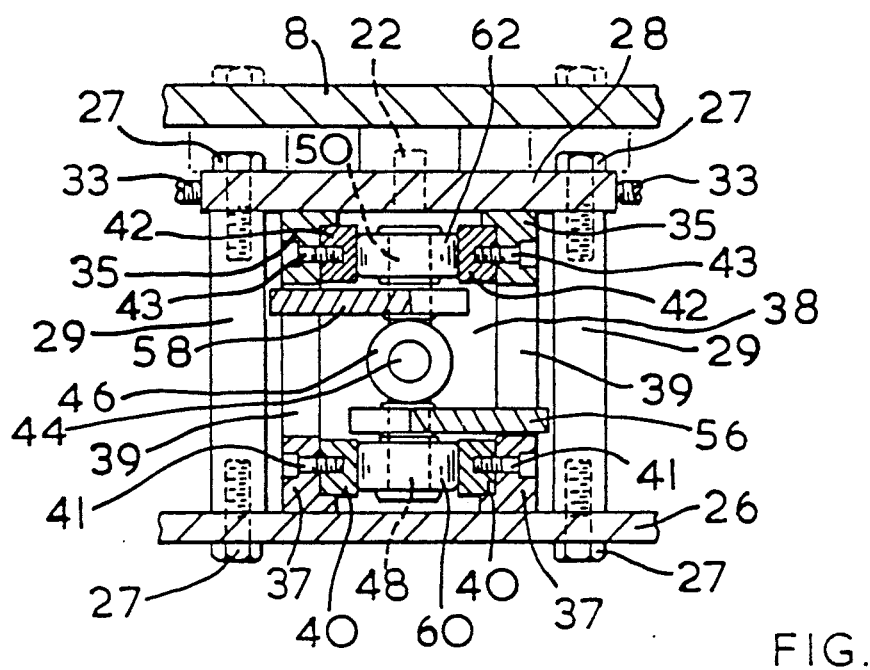
FIG. 6 shows a view in a section taken along the VI—VI of FIG. 1.

A box assembly is mounted between the two plates 26 and 28 of the cage assembly 24 (see FIG. 6). The box assembly comprises two rearward, vertically extending, bars 35 fixed to the plate 28, two similar, forward, vertically extending bars 37, fixed to the plate 26, two bars 39,39, joining lower end portions of the bars 35 and 37, and the cross plate 30 which joins upper end portion of the bars 35 and 37.

Substantially vertically extending bearing guide bars 40,40 are secured to the bars 37 by screws 41, and similar guide bars 42,42 are secured to the bars 35 by screws 43.

The piston and cylinder assembly 38 has an upwardly extending piston rod 44 to which is secured a block 46 having two outwardly extending aligned stub shafts 48,50. Pivoted on bearings 52,54 on the shafts 48,50 are two links or levers 56,58, and outwardly of the levers 56,58 the stub shafts 48,50 support rollers 60,62. These rollers are positioned each between a pair of guide bars, the roller 60 between the guide bars 40,40, the roller 62 between the guide bars 42,42. An upper end portion of the lever 56 is pivoted between lugs 64 depending from the sleeve member 12 of the second mould support: an upper end portion of the lever 58 is pivoted between lugs 66 depending from the sleeve member 4 of the first mould support 2.

On upward movement of the piston rod, 44, the block 46 is moved upwards and is constrained to move in a vertical path by the rollers 60,62 running between the guide bars 40,42. The levers 58,56 are thus forced towards a horizontal position, thus forcing the lugs 64,66 away from each other. The sleeve members 4 and 12 thus move in opposite directions to carry the mould supports 2, 10 towards their closed position. At the top end of the stroke of the piston rod 44, the levers 56,58 are moved close to the top dead center position into slots 68,70 (FIG. 3) formed in the cross plate 30. Downward movement of the piston rod 44 moves the mould supports from their closed into their open positions.

It can be seen that when the mould supports are in their closed positions, adjustment of the angular position of the cage assembly 24 about the pivot 22 will cause transverse adjusting movement of the levers 56 and 58, and thus the previously mentioned transverse adjustment of the center line of the mould halves with respect to the frame member 8.

Figure 4:
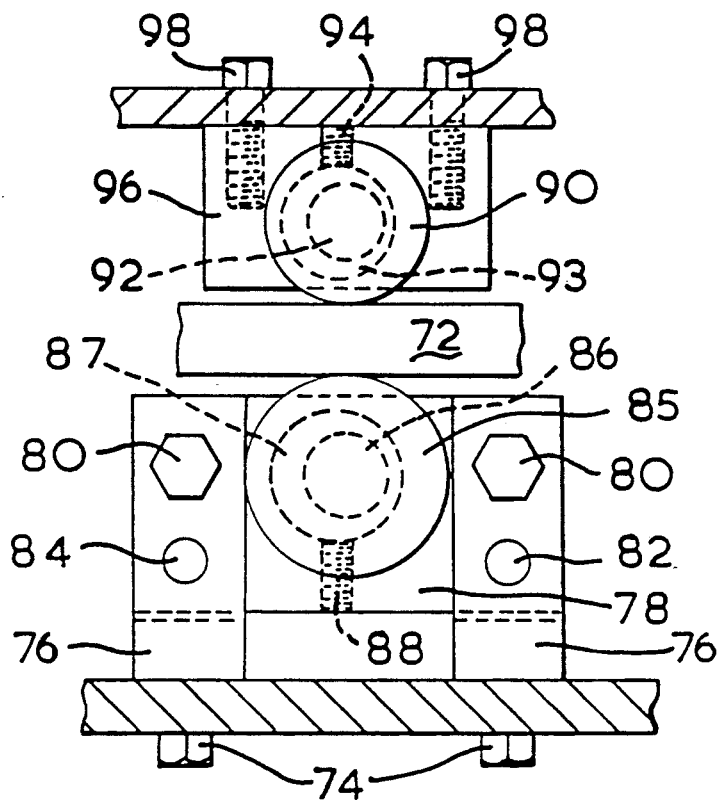
FIG. 4 shows a view in section taken along the line IV—IV of FIG. 1.
Figure 5:
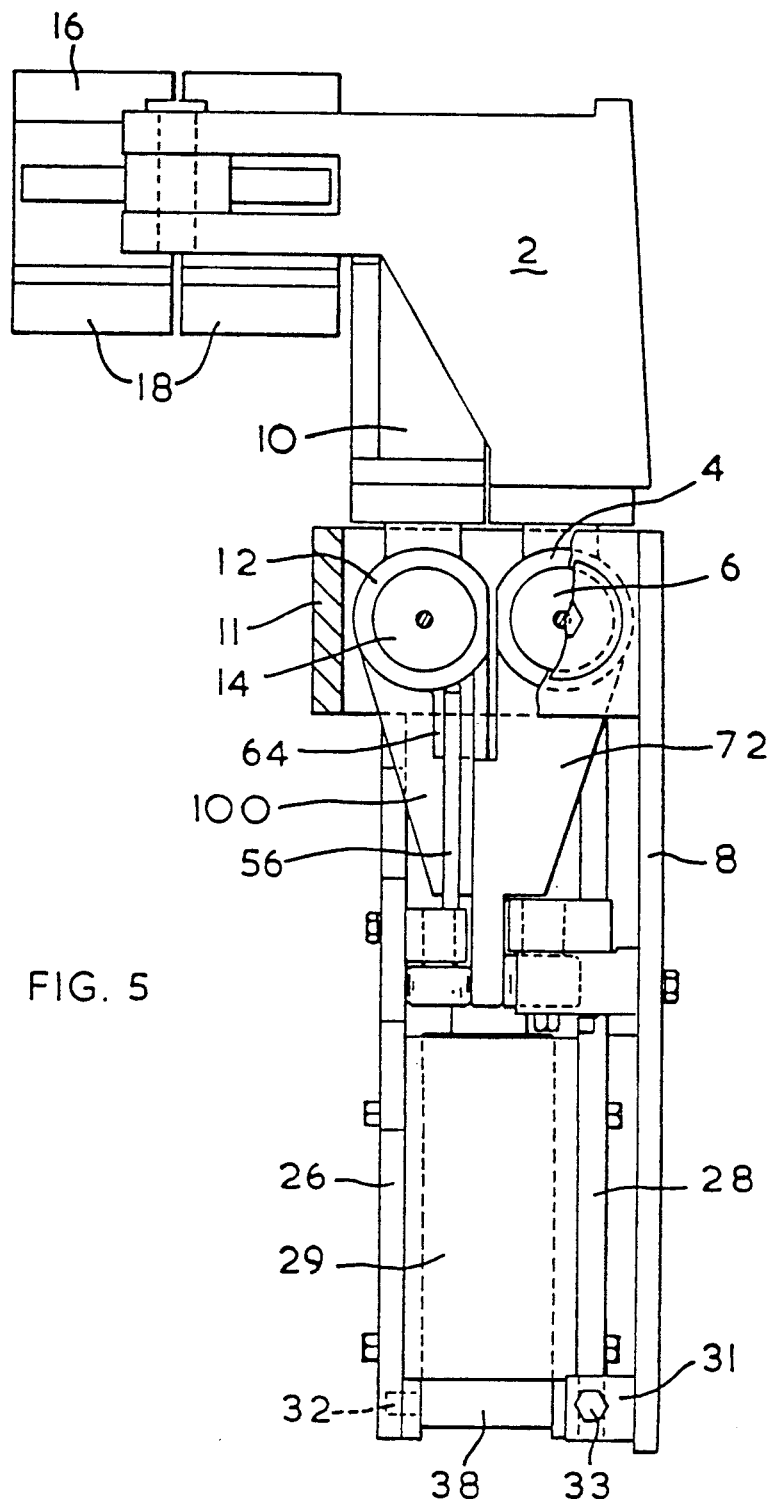
FIG. 5 shows a side view of the mould mechanism.

The mould mechanism comprises aligning means whereby the inclination of the plane of the moulds 18 supported by the mould supports 2 and 10 to the horizontal plane extending through the axes of the shafts 6 and 14 can be adjusted . The mould support 2 comprises a depending arm 72 (see FIGS. 1 & 5). This arm 72 engages aligning means which is best seen in FIG. 4. Secured by bolts 74 to the front plate 26 of the cage assembly is a block 76. A further block 78 is fixed to the block 76 by two bolts 80, and pins 82 and 84.

A roll 85 is secured to a pin 86 mounted in an eccentric bushing 87 secured in the block 78 by a set screw 88, and engages one face of the arm 72. A further roll 90 is secured to a pin 92 mounted in an eccentric bushing 93 secured by a set screw 94 in a block 96 fixed to the plate 28 by two bolts 98,98, and engages the opposite face of the arm 72. By adjustment of the position of the roll 85 by rotation of the eccentric bushing 87, the position of the arm 72 about the shaft 6 may be adjusted, thus to adjust the angle of inclination of the mould support 2 and the moulds supported by it. The position of the roll 90 may also be adjusted so that the arm 72 is maintained in contact with the roll 85.

The mould support 10 comprises a depending arm 100, similar to the arm 72, which engages aligning means 102 (see FIG. 1) which is operated in a similar fashion thus enabling the inclination of the mould support 10 similarly to be adjusted.

It will be realized that the mould mechanism which has been described is an integral unit, and the frame member of the mechanism may readily be secured in the frame of an individual section of a glassware forming machine with only the supply of compressed air to be connected to the mechanism to make it operate. When such a mechanism is installed in an appropriate frame, fine adjustment of the position of the center line of the moulds and the inclination of the mould supports may then be carried out to align the mould cavities with the other operating parts of the section.

I claim:

1. A glassware forming machine having a mould mechanism comprising
a frame member,
horizontal shafts supported in the frame member,
first and second mould supports mounted for sliding movement along the horizontal shafts for displacement between a closed position and an open position,
means for moving the mould supports between such closed and open position comprising
a cage assembly pivotally supported in the frame member about a horizontal pivot.
a piston and cylinder device mounted in the cage assembly,
first and second links connecting the first and second mould supports respectively to the piston and cylinder device so that on operation of the piston and cylinder device the mould supports are moved between their open and their closed positions,
and means for adjust angular position of the cage assembly about said pivot.

2. A glassware forming machine according to claim 1 wherein the piston and cylinder device is pivotally mounted in and with respect to the cage assembly.

3. A glassware forming machine according to claim 1 wherein the piston and cylinder device is mounted in a generally vertical position in the cage assembly.

4. A glassware forming machine according to claim 3 wherein the piston and cylinder device comprises a piston rod which supports rollers rotatable about an axis and constrained to run between substantially vertical guides mounted in the cage assembly, the links being connected to the piston rod so that they pivot about the axis.

5. A glassware forming machine mechanism according to claim 1 comprising positioning screws mounted in the frame member and engaging the cage assembly to enable adjustment of the position of the cage assembly about its pivot.

6. A glassware forming machine according to claim 1 wherein the mould mechanism is constructed as a unit and may be positioned in an appropriate cavity in the frame of the glassware forming machine.

* * * * *